United States Patent [19]

DiSanto et al.

[11] Patent Number: 5,293,528

[45] Date of Patent: *Mar. 8, 1994

[54] ELECTROPHORETIC DISPLAY PANEL AND ASSOCIATED METHODS PROVIDING SINGLE PIXEL ERASE CAPABILITY

[75] Inventors: Frank J. DiSanto, North Hills; Denis Krusos, Lloyd Harbor, both of N.Y.

[73] Assignee: Copytele, Inc., Huntington Station, N.Y.

[*] Notice: The portion of the term of this patent subsequent to Oct. 1, 2008 has been disclaimed.

[21] Appl. No.: 841,380

[22] Filed: Feb. 25, 1992

[51] Int. Cl.⁵ .............................................. G09G 3/34
[52] U.S. Cl. ..................................... 345/107; 359/296
[58] Field of Search ..................... 340/787; 204/180.1, 204/299 R; 359/296

[56] References Cited

U.S. PATENT DOCUMENTS

| | | | |
|---|---|---|---|
| 5,041,824 | 8/1991 | DiSanto et al. | 340/787 |
| 5,053,763 | 10/1991 | DiSanto et al. | 340/787 |
| 5,077,157 | 12/1991 | DiSanto et al. | 204/299 R |
| 5,177,476 | 1/1993 | DiSanto et al. | 340/787 |

Primary Examiner—Tommy P. Chin
Assistant Examiner—A. Au
Attorney, Agent, or Firm—Arthur L. Plevy

[57] ABSTRACT

A tetrode type electrophoretic display includes local anode lines disposed perpendicular to the grid lines and having a tined configuration. In operation, the local anode may be used to write and erase selected independent pixels by applying appropriate voltages to the various electrodes of the display in the proper sequence. The tetrode employed preferably includes an intermediate mesh to permit maintaining displayed images after power removal.

13 Claims, 3 Drawing Sheets

ELECTROPHORETIC DISPLAY PANEL AND ASSOCIATED METHODS PROVIDING SINGLE PIXEL ERASE CAPABILITY

FIELD OF THE INVENTION

The present invention relates to an electrophoretic display panel apparatus and methods of operation and, more particularly, to multi-electrode electrophoretic display panels which permit pixel erasure.

BACKGROUND OF THE INVENTION

Electrophoretic displays (EPIDS) are now well known. A variety of display types and features are taught in several patents issued in the names of the inventors herein, Frank J. DiSanto and Denis A. Krusos and assigned to the assignee herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc. The following issued patents and pending applications by the inventors herein and assigned to CopyTele, Inc. and which may have some relevance to the present invention are: application Ser. No. 07/794,969, filed Nov. 20, 1991, entitled ELECTROPHORETIC DISPLAY PANEL WITH INTERNAL MESH BACKGROUND SCREEN; DUAL ANODE FLAT PANEL ELECTROPHORETIC DISPLAY APPARATUS, U.S. Pat. No. 5,053,763, issued Oct. 1, 1991; ELECTROPHORETIC DISPLAY WITH SELECTIVE LINE ERASURE, U.S. Pat. No. 5,066,946 issued Nov. 19, 1991; SEMI-TRANSPARENTELECTROPHORETIC INFORMATION DISPLAYS (EPID) EMPLOYING MESH LIKE ELECTRODES, U.S. Pat. No. 5,041,824 issued on Aug. 20, 1991; application Ser. No. 752,184 filed on Aug. 23, 1991 entitled ELECTROPHORETIC DISPLAY WITH SINGLE CHARACTER ERASURE, which is a continuation of Ser. No. 699,216 filed on May 13, 1991 having the same title; application Ser. No. 07/667,630, filed Mar. 11, 1991, entitled ELECTROPHORETIC DISPLAY PANEL WITH PLURAL ELECTRICALLY INDEPENDENT ANODE ELEMENTS, each of which are indicated below.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the sign and direction of the electrostatic field and the charge on the pigment particles. Certain of the electrophoretic display apparatus taught in such issued Patents are "triode-type" displays having a plurality of independent, parallel, cathode row conductor members deposited in the horizontal with transverse grid lines insulated from the anode lines. The grid and cathode lines form an X-Y matrix which can be accessed to address and control the pigment particles according to a selected X-Y intersection or pixel. U.S. Pat. No. 5,041,024 depicts a "tetrode" type display including a mesh electrode located between the anode and the X-Y grid cathode matrix. The operating voltages on both of the cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

An alternative EPID construction is described in U.S. Pat. No. 5,053,763, referred to above, which relates to an electrophoretic display in which the cathode/grid matrix as is found in triode-type displays is overlayed by a plurality of independent separately addressable "local" anode lines to constitute a "tetrode". The local anode lines are deposited upon and align with the grid lines and are insulated therefrom by interstitial lines of photoresist. The local anode lines may be in addition to a "remote" anode, which is a layer deposited upon the anode faceplate as in triode displays. The dual anode structure aforesaid provides enhanced operation by eliminating unwanted variations in display brightness between frames, increasing the speed of the display and decreasing the anode voltage required during Write and Hold cycles, all as explained in application Ser. No. 07/345,825, which is incorporated herein by reference.

In yet another form of EPID, as described in application Ser. No. 07/667,630, a triode is formed by a plurality of independent anode elements deposited upon one faceplate and a plurality of independent cathode elements deposited at right angles thereto on an opposing faceplate. An electrically continuous grid with a plurality of pores therein is deposited upon a layer of insulation overlying the cathode lines and is intermediate the cathode and anode lines.

To be useful as a display, an electrophoretic display must be able to assume a blank or erased state; must be able to display character data written during a write operation; and must be able to continually maintain or hold the written characters (and blank characters) in a hold mode until they are erased or overwritten. These three modes of operation, i.e., erase, write and hold are well documented in existing patents issued to the inventors herein and such description shall not be repeated at length herein. The above-described patents and pending patent applications provide apparatus and methods for hold, full write (all pixels written), full erase (all pixels erased), selective write (writing selective pixels in previously erased positions), selective character line erasure and selective character erasure. As one can ascertain, a character is generated by the activation or writing in of a plurality of pixels, each of which can form or provide part of the character. It is therefore an object of the present invention to provide a method for operating an electrophoretic display with an internal mesh element to allow single pixel erasure, thereby simultaneously realizing the advantages and benefits of a display of this type, as well as, the desired discrete erasure function.

SUMMARY OF THE INVENTION

The problems and disadvantages associated with pixel display control in conventional electrophoretic displays are overcome by the present invention which includes in a tetrode-type electrophoretic display of the type having a plurality of parallel cathode lines arranged in a given direction, a plurality of parallel grid lines insulated from the cathode lines and perpendicular thereto to form an X-Y addressing matrix, a plurality of local anode lines deposited upon the grid lines and insulated therefrom by insulator strips, a remote anode separated from the local anode lines with the space therebetween accommodating an electrophoretic dispersion including pigment particles suspended in a fluid and an electrically conductive screen allowing the pigment particles to pass therethrough, the improvement of disposing the local anode lines perpendicular to the grid lines. In a method of operating the display the cathode lines, the grid lines, the screen, the local anode lines and the remote anode are electrically connected to a source of electrical potential energy. The source simultaneously provides a selected set of independent voltages to each of the cathode lines, the grid lines, the screen, the local anode lines and the remote anode under the control of a controller for controlling the independent voltages supplied by the source. By controlling the source of electrical potential energy, voltage levels are applied to the cathode matrix, the grid matrix, the screen, the local anode lines and the remote anode to selectively write and erase single pixels on the display.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
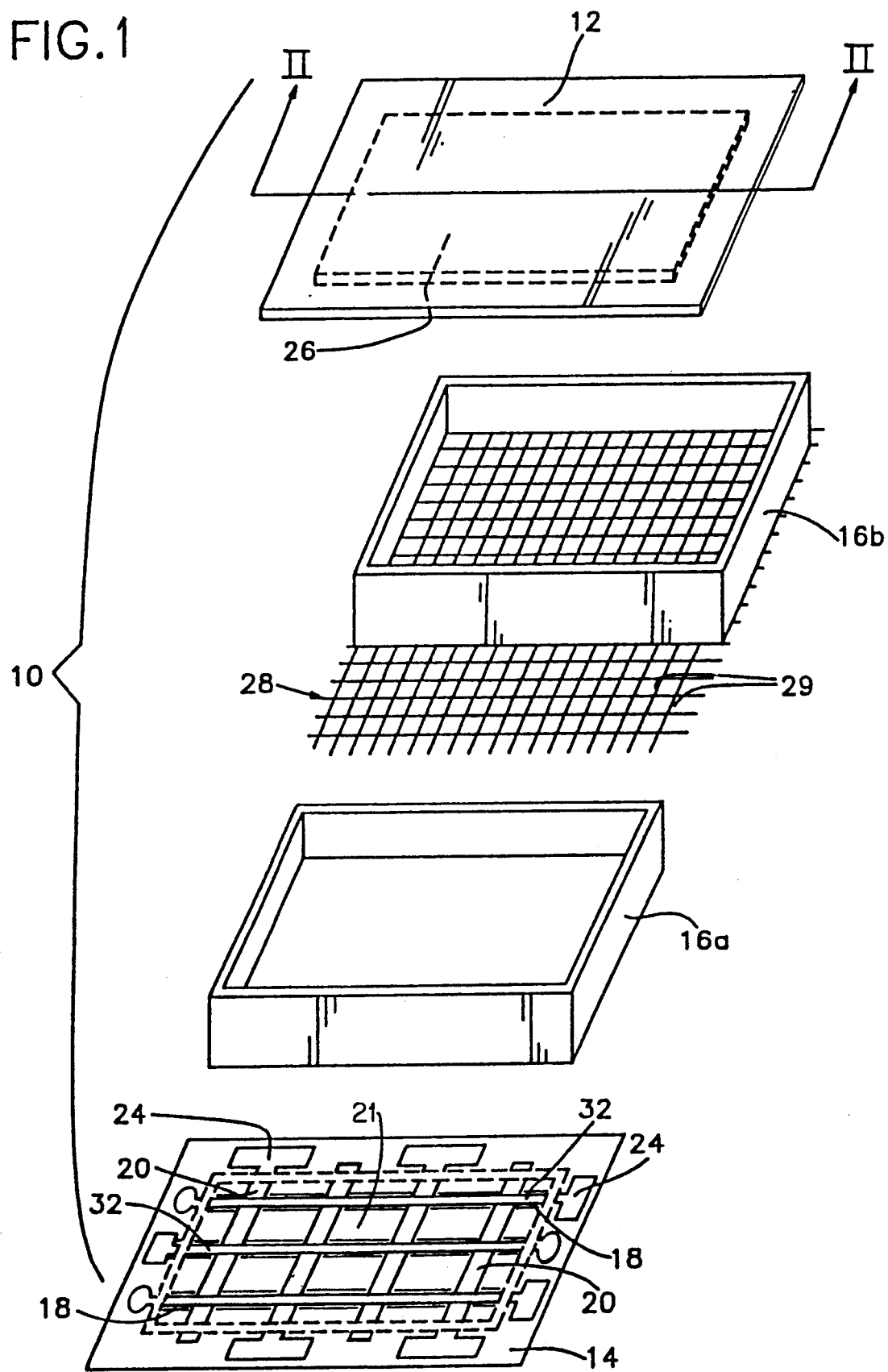
FIG. 1 is an exploded perspective view of an electrophoretic display in accordance with an exemplary embodiment of the present invention.

FIG. 1 shows an electrophoretic display 10 in accordance with the present invention. The display 10 has an anode faceplate 12 and a cathode faceplate 14 which are sealably affixed on either side of intermediate spaces 16a and 16b to form a fluid tight envelope for containing dielectric/pigment particle suspension or electrophoretic fluid (not shown). The faceplates 12 and 14 are typically flat glass plates upon which are deposited conductor elements to comprise the site of electrostatic charge for inducing motion in the electrophoretic fluid. The techniques, materials and dimensions used to form the conductor elements upon the faceplates and the methods for making EPIDS, in general, are shown in U.S. Pat. Nos. 4,655,897, 4,732,830 and 4,742,345 which patents are incorporated herein by reference.

In the invention, as depicted in FIG. 1, for example, a plurality of independent, electrically conductive cathode members 18 (horizontal rows) are deposited upon the cathode faceplate 14 using conventional deposition and etching techniques. It is preferred that the cathode members 18 be composed of Indium Tin Oxide (ITO) as set forth in U.S. Pat. No. 4,742,345. A plurality of independent grid conductor members 20 are superimposed in the vertical over the cathode members 18 and are insulated therefrom by an interstitial photoresist layer 22 (see FIG. 2). The grid members 20 may be formed by coating the photoresist layer 22 with a metal, such as nickel, using sputtering techniques or the like, and then selectively masking and etching to yield the intersecting but insulated configuration shown in FIGS. 1 and 2. Each cathode and grid member 18, 20 terminates at one end in a contact pad 24 or is otherwise adapted to permit connection to display driver circuitry (not shown).

As can be appreciated from FIG. 1, the overlaying of grid lines 20 upon cathode lines 18 creates a plurality of wells 21 bounded by the intersecting lines 20 and 18. As is taught in prior patents, more wells 21 may be defined by forming the grid 20 and cathode 18 lines in a tyned configuration. The wells 21 communicate with the fluid contained within the EPID and thus permit pigment particles to travel close to the glass cathode faceplate 14 where they are most clearly visible.

An anode 26 is formed on an interior surface of the anode faceplate 12 by plating with a thin layer of conductor material, such as, chrome. A mesh element or screen 28 is sandwiched between spacers 16a and 16b to provide at least a partial barrier to the passage of light through the EPID 10. The mesh screen 28 has a plurality of pores 29 through which pigment particles may pass so as not to obstruct the normal operation of the EPID. Coincidental to the light barrier function, the mesh itself is an optically significant element, i.e., it is readily visible to the naked eye. It is preferred that the mesh appear as a flat planar object. This is achieved by making the mesh with the minimum pore size which does not critically impede pigment movement. A mesh screen having suitable characteristics is commercially available from the Buckee Mears Co., viz., a perforated stainless steel mesh having an approximate thickness and pore size of 10 to 12 mils. The mesh has an open area ratio, i.e., the ratio of the sum of pore area to the total surface area on one surface of the screen, of approximately 40% to 50%. The mesh is blackened by an anodizing process. The significance of the mesh screen 28 is that it provides a solid visual background for the display of pixels and it permits a reduction of dye concentration to effect a desired background intensity. It has also been observed that the above-described mesh screen provides such an effective background that no dye is required. The mesh screen 28 also functions to prevent inadvertent backlighting due to the overall translucence of the EPID 10. It should be observed that the screen 28 is positioned in the EPID 10 such that when the pigment is in the display position, it is on one side of the screen 28 and when it is in the written position it is on the other side of the screen 28, obscured from view by the screen 28 and/or dye in the solution.

Figure 2:
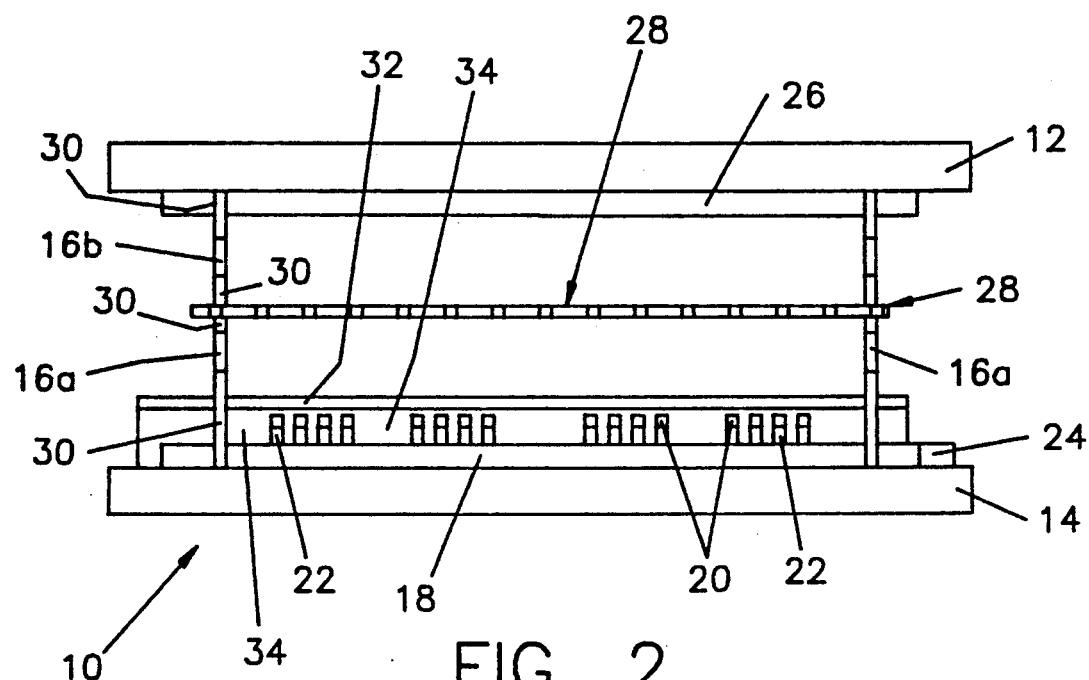
FIG. 2 is a cross-sectional view of the electrophoretic display shown in FIG. 1 in the unexploded state, taken along section line II—II and looking in the direction of the arrows.

In the present invention, the screen 28 is fabricated from an electrically conductive material so that it can be utilized to carry an electric charge for the purpose of aiding in controlling the movement of the pigment particles. FIGS. 1 and 2 illustrate the incorporation of the mesh screen 28 into a tetrode-type display. The tetrode display includes a plurality of local anode elements 32 which are deposited upon corresponding photoresist insulator strips 34 (see FIG. 2) formed perpendicular to the grid elements 20. The methods for forming the local anode elements 32 are set forth at length in application Ser. No. 07/345,825. In brief, a layer of SiO2 is applied over the grid elements 20, followed by a layer of photoresist. A layer of metal, e.g., nickel or aluminum, is applied over the photoresist layer. Yet another layer of photoresist is applied over the metal layer, and is then masked, exposed and developed perpendicular to the grid elements. The metal layer is then etched with a suitable solution. The photoresist is then plasma etched down to the cathode structure.

To form an EPID 10 like that shown in FIG. 1, the parts may be assembled in a stack and placed in an oven for baking. The spacers 16a and 16b, in that case, would be coated on surfaces which contact adjacent elements with a material which would become plastic at baking temperatures, such as, epoxy. Upon baking, the meltable material flows and the elements form a laminate upon cooling. Of course, other methods exist within the scope of the normally skilled artisan for assembling the elements of the EPID 10 shown, such as, e.g., gluing. The lamination of the EPID elements forms an envelope for containing the dielectric fluid/pigment particle suspension.

The discrete cathode and grid members 18 and 20 of the electrophoretic display 10 can assume a variety of voltages during operation for controlling the display operations of erase, hold and write at the numerous points of intersection defining a cathode/grid matrix. A display panel would have a large number of intersections, e.g., 2,200×1,700 or a total of 3,740,000 separately addressable intersection points. for ease of illustration, however, only a few cathode members 18 and grid members 20 are depicted. Similarly, the shape and proportions of the elements depicted are for purposes of illustration only. The dimensions of the respective elements have also been greatly enlarged for illustration and are not necessarily in proportion to an actual operational device. More illustrations of electrophoretic displays, their components and electrical circuitry can be seen by referring to U.S. Pat. Nos. 4,742,345 and 4,772,820, each being awarded to the inventors herein and which are incorporated by reference herein.

Certain details have been omitted from the device depicted, but are taught in prior patents. For example it has been determined that a SiO2 coating on certain of the conductor elements provides beneficial results. See application Ser. No. 07/675,733, filed Mar. 27, 1991 and entitled ELECTROPHORETIC DISPLAY PANEL WITH SEMICONDUCTOR COATED ELEMENTS by the inventors herein and assigned to the assignee herein.

It has previously been shown that certain conductor elements having a tined configuration provide enhanced resolution, see U.S. Pat. No. 4,742,345 issued to the inventors herein and assigned to the present assignee, such patent being incorporated herein by reference. In the present invention, it is preferred that each local anode line have a tined configuration as described more specifically below.

FIG. 2 shows the electrophoretic display of FIG. 1 assembled and in cross-section. The remote anode 26 in the embodiment shown, is a plate-like area of conductor material having a length and width essentially matching that of the cathode/grid matrix, i.e., coextensive with the matrix, as is taught in the above referenced patents and applications of the present applicant. The cathode elements 18, grid elements 20 and grid insulator strips 22 as are also like those shown in the foregoing patents, etc. Since all conductor elements are quite thin, they extend beneath the interstitial spacers 16a and 16b without special provision and at least one end thereof provide a terminal exterior to the envelope for connecting display driver circuitry (not shown). For the purposes of illustration, epoxy bonding material 30 is depicted providing the laminating bond between spacers 16a, 16b and the faceplates 12 and 14 and for laminating the mesh screen 28 between the spacers 16a and b.

Figure 3:
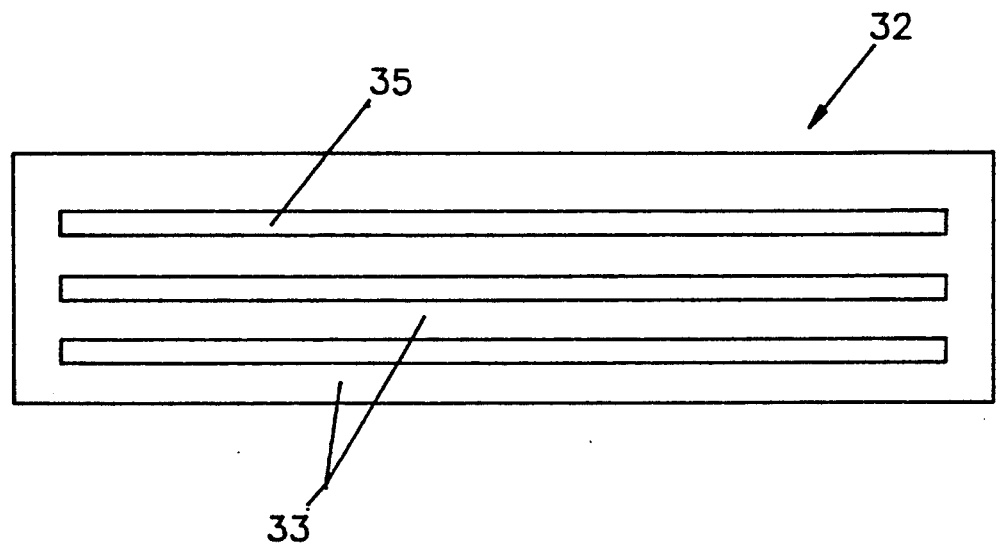
FIG. 3 is a plan view of a local anode line of the display having a tined configuration.

A tined configuration for the local anode lines 32 is depicted in FIG. 3. Each local anode line preferably has four tines 33 which may, for example be about 16.8 um wide and separated by a space 35 approximately 15 um wide, each tine rejoining a common electrically continuous portion of the local anode at both terminal ends.

The operation of the display will now be described. For the purposes of illustration, the following may be taken as initial assumptions: (1) negatively surface-charged, light colored pigment particles suspended in a clear or dark dielectric fluid; (2) a dark colored screen element 28; and (3) visualization of the image at the cathode faceplate 14. Given these initial conditions, a written pixel is represented by the absence of visible pigment particles, hence is a dark pixel. Erased pixels would be represented by visible pigment particles at that location. For example, a totally erased display is completely light colored due to the presence of visible pigment particles at the cathode faceplate. It should be understood that these assumptions are merely exemplary, given that the surface of visualization could be the anode faceplate. Alternatively, the coloration of the particles and the background could be altered, etc., all within the confines of the present invention as described herein.

Since the voltages applied to the various elements of the display for a given function will depend upon the dimensions and distance between elements, the following dimensions can be assumed for the purposes of illustration:

(1) Cathode line 18 width=112 μm.
(2) Cathode line 18 spacing=15 μm.
(3) Photoresist layer 22 thickness=3-4 μm.
(4) Grid line 20 width and composition=112 μm (6 tynes), chrome
(5) Photoresist layer 34 thickness=3-4 μm.
(6) Local anode 32 width=112 μm (4 tynes).
(7) Distance from mesh 28 to local anode 32=7 mils.
(8) Remote anode 26 composition=ITO.
(9) Distance from mesh 28 to remote anode 26=7 mils.

Given the foregoing assumptions, exemplary voltages applied to the various elements in the EPID to perform certain basic functions and for performing the function of single pixel erase are set forth below.

The following operations, typical voltages would be:
+V1=+200 (PULSED TO +400 DURING FULL WRITE)
−V1=−300
+V2=+140
−V2=−200

+V3= +20 (PULSED TO +32 DURING WRITING OF IMAGE)
GRID (VDD)=0 (PULSED TO +5 DURING WRITING OF IMAGE)
GRID (VSS)= −10
CATH. (VDD)= +15 (PULSED TO +18 DURING WRITING OF IMAGE)
CATH. (VSS)=0
VAC=100 V RMS
(ANODE=REMOTE ANODE; L.A.=LOCAL ANODE)

TO PERFORM FULL WRITE APPLY THE FOLLOWING VOLTAGES:
V ANODE= +V1
V MESH=VAC
V L.A.=0
V GRID=GRID (VDD)
V CATH=0

TO PERFORM FULL ERASE:
V ANODE= −V1
V MESH= −V2
V L.A.=0
V GRID=VDD
V CATH=0

TO PLACE THE DISPLAY IN A HOLD CONDITION:
V ANODE= +V1
V MESH= +V2
V L.A.=0
V GRID=GRID (VSS)
V CATH=CATH. (VDD)

TO PREPARE FOR SELECTIVE PIXEL WRITING:
The GRID is raised to GRID (VDD) and the returned to GRID (VSS) to remove excess pigment from the wells. Pigment moves from the MESH to the REMOTE ANODE by applying the following voltages:
V ANODE= +V1
V MESH=VAC
V L.A.=0
V GRID=GRID (VSS)
V CATH=CATH. (VDD)

LOCAL ANODE HOLD is then established by applying the following voltages:
V ANODE= +V3
V MESH=0
V L.A.= +V3
V GRID=GRID (VSS)
V CATH=CATH. (VDD)

TO WRITE IMAGE:
The image is then written on the local anode by selectively raising appropriate grid lines to GRID (VDD) and sequentially lowering cathode lines to 0 volts. During the writing mode, the pigment passes from the cathode faceplate through the spaces between the local anode tines to the local anode. The purpose of writing to the local anode is to permit subsequent erasure of the panel from the local anode which eliminates the flash which occurs when erasing from the remote anode and also to permit single character erase and rewrite.

TO SELECTIVELY ERASE A GIVEN PIXEL:
The local anode lines are driven individually. When it is desired to erase a particular pixel, the grid, cathode and local anode lines intersecting at that pixel are given the following potentials:
V GRID=GRID (VDD)
V CATH.−CATH. (VDD)
V L.A.=0

The remaining elements receive the following potentials:
All other grids=GRID (VSS)
All other local anodes= +V3
All other cathodes=CATH. (VDD)

TO PLACE SELECTED PIXEL IN HOLD:
Intersecting Grid line=GRID (VSS)
Intersecting Local Anode= +V3
All cathode=CATH. (VDD)

Figure 4:
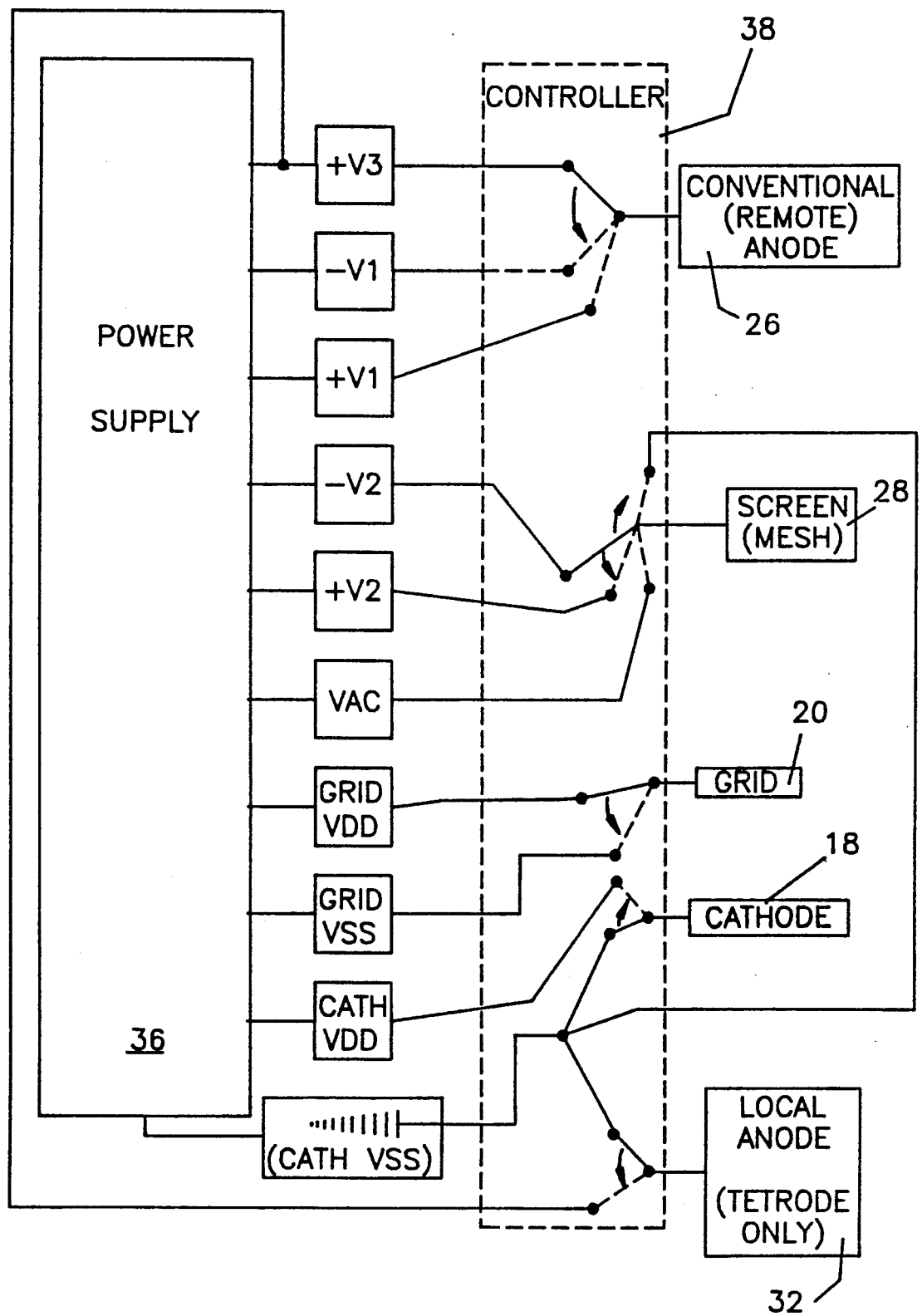
FIG. 4 is a schematic diagram showing the connection of the devices depicted in FIGS. 1 and 2 to a power supply as controlled by a controller.

FIG. 4 illustrates in schematic form how the various components of the electrophoretic display described above in reference to FIGS. 1 and 2 might be electrically connected to a suitable power supply 36 under the control of a digital controller 38 in order to assume the correct voltage states during the operations described.

A display 10 as previously described, but without having a mesh element 28, could, if operated as set forth above, perform single pixel erase. The mesh electrode 28, however, permits the removal of power while maintaining the image intact, and is therefore preferable.

It should be understood that the embodiments described herein are merely exemplary and that a person skilled in the art may make many variations and modifications without departing from the spirit and scope of the invention as defined in the appended claims.

We claim:

1. In a tetrode-type electrophoretic display of the type having a plurality of parallel cathode lines arranged in a given direction, a plurality of parallel grid lines insulated by first insulator strips from said cathode lines and perpendicular thereto to form an X-Y addressing matrix, a plurality of local anode lines deposited upon said grid lines and insulated therefrom by second insulator strips, a remote anode separated from said local anode lines with space therebetween accommodating an electrophoretic dispersion including pigment particles suspended in a fluid and an electrically conductive screen allowing said pigment particles to pass therethrough, the improvement comprising:
   each of said local anode lines being disposed perpendicular to said grid lines, said local anode lines having at least two tines with spaces therebetween for at least a portion of the length of said local anode lines.

2. The device of claim 1, wherein said second insulator strips have openings therethrough aligning with said spaces between said tines of said local anode lines.

3. The device of claim 2, wherein said grid lines and said first insulator strips have openings therethrough communicating with said openings in said second insulator strips.

4. The device of claim 3, wherein said tines are four in number.

5. A method for operating a tetrode-type electrophoretic display of the type having a plurality of parallel cathode lines arranged in a given direction, a plurality of parallel grid lines insulated from said cathode lines and perpendicular thereto to form an X-Y addressing matrix, a plurality of local anode lines deposited upon said grid lines perpendicular thereto and insulated therefrom by insulator strips, a remote anode separated from said local anode lines with space therebetween accommodating an electrophoretic dispersion including pigment particles suspended in a fluid and an electrically conductive screen allowing said pigment particles to pass therethrough, includes the steps of:
   electrically connecting said cathode lines, said grid lines, said screen, said local anode lines and said remote anode to a source of electrical potential energy, said source simultaneously providing a selected set of independent voltages to each of said cathode lines, said grid lines, said screen, said local anode lines and said remote anode under the control of control means for controlling said independent voltages supplied by said source; and selectively erasing single pixels previously written on said display by controlling said source of electrical potential energy with said control means such that voltage levels are applied to said cathode lines, said grid lines, said screen, said local anode lines and said remote anode.

6. The method of claim 5, further including a step of local anode writing prior to said step of selectively erasing, wherein said previously written single pixels are written upon said local anode.

7. The method of claim 6, wherein said step of selectively erasing single pixels includes providing a voltage of approximately GRID (VDD) to selected said grid lines and a voltage of approximately 0 to selected said local anode lines intersecting said selected grid lines at said single pixels to be erased.

8. The method of claim 7, wherein said step of selectively erasing single pixels includes maintaining all grid lines other than those intersecting pixels to be erased at an approximate voltage of GRID (VSS); maintaining all local anode lines other than those intersecting pixels to be erased at a voltage of approximately +V3; and maintaining a voltage of approximately CATH (VDD) on said cathode lines.

9. The method of claim 8, further including placing said local anode lines in a hold condition by providing approximate voltage levels of +V3 to said remote anode, 0 volts to said screen, +V3 to said local anode lines, GRID (VSS) to said grid lines, and CATH (VDD) to said cathode lines before said step of local anode writing.

10. The method of claim 9, wherein said grid lines and said cathode lines of said X-Y matrix define a plurality of wells proximate said plurality of intersections thereof, said wells communicating with said space accommodating said fluid and further including the step of removing excess pigment from said wells and inducing the movement of pigment from said screen to said remote anode by providing approximate voltage levels of +V1 to said remote anode, VAC to said screen, 0 to said local anode lines, GRID (VSS) to said grid lines, and CATH (VDD) to said cathode lines prior to said step of placing said local anode lines in a hold condition.

11. The method of claim 10, further including a step of placing said selectively erased single pixels in a hold condition after said step of selective pixel erasure by providing approximate voltage levels of GRID (VSS) to said selected said grid lines and +V3 to said selected said local anode lines intersecting said selected said grid lines.

12. The method of claim 11, further including a step of fully erasing said display prior to said step of removing excess pigment by providing approximate voltage levels of −V1 to said remote anode, −V2 to said screen, 0 to said local anode, GRID (VDD) to said grid lines and 0 to said cathode lines.

13. The method of claim 12, further including the step of placing said display in a preliminary hold condition after said step of fully erasing and prior to said step of removing excess pigment by providing approximate voltage levels of +V1 to said remote anode, +V2 to said screen, 0 to said local anode lines, GRID (VSS) to said grid lines and CATH (VDD) to said cathode lines.

* * * * *